United States Patent
Itakura (10) Patent No.: US 7,621,556 B2
(45) Date of Patent: Nov. 24, 2009

(54) STRUCTURE FOR ATTACHING INTERIOR TRIM PANEL AROUND AUTOMOTIVE FRONT PILLAR

(75) Inventor: Akira Itakura, Hamamatsu (JP)

(73) Assignee: Suzuki Motor Corporation (JP)

( * ) Notice: Subject to any disclaimer, the term of this patent is extended or adjusted under 35 U.S.C. 154(b) by 252 days.

(21) Appl. No.: 11/558,117

(22) Filed: Nov. 9, 2006

(65) Prior Publication Data
US 2007/0108742 A1 May 17, 2007

(30) Foreign Application Priority Data
Nov. 14, 2005 (JP) ............................... 2005-328665

(51) Int. Cl.
*B60R 21/21* (2006.01)
*B60R 13/02* (2006.01)
(52) U.S. Cl. ............ 280/728.2; 280/730.2; 296/193.06; 296/39.1; 296/1.08
(58) Field of Classification Search ............... 280/728.2, 280/730.2; 296/1.08, 39.1, 193.06
See application file for complete search history.

(56) References Cited

U.S. PATENT DOCUMENTS

| | | | | |
|---|---|---|---|---|
| 5,580,116 A | * | 12/1996 | Patel et al. ................. | 296/39.1 |
| 5,791,683 A | * | 8/1998 | Shibata et al. ............. | 280/730.2 |
| 5,791,716 A | * | 8/1998 | Takagi et al. ............... | 296/39.1 |
| 5,921,576 A | | 7/1999 | Sinnhuber | |
| 6,095,593 A | * | 8/2000 | Johann et al. ............ | 296/187.05 |
| 6,145,870 A | * | 11/2000 | Devane et al. ............ | 280/728.2 |
| 6,152,485 A | | 11/2000 | Kato | |

(Continued)

FOREIGN PATENT DOCUMENTS

CN 1689872 A 11/2005

(Continued)

OTHER PUBLICATIONS

German Office Action corresponding to German Patent Application No. 102006053990.7-56 dated Jun. 30, 2008.

(Continued)

*Primary Examiner*—Paul N Dickson
*Assistant Examiner*—Laura Freedman
(74) *Attorney, Agent, or Firm*—Myers Bigel Sibley & Sajovec, PA (57) ABSTRACT

In a structure for attaching an interior trim panel around an automotive front pillar, in which an airbag (6) is stored in a space in the range from the inside of a front pillar trim (2) to the inside of a roof lining (3), an engagement projection (92) projecting in almost the same direction as the deployment direction of the airbag is provided at intervals in the range from a flange (11) of a door opening (7) to the inside of a vehicle compartment in a portion which is adjacent to a joint portion (L1) of the front pillar trim and the roof lining and extends along the door opening of a vehicle body panel (10) located on the inside of the front pillar trim, and on the other hand, an engagement portion (24) projecting in the substantially opposite direction to the deployment direction of the airbag is provided on the back surface of an end edge portion on the door opening side of the front pillar trim (2), whereby the engagement portion (24) is engaged to the engagement projection (92).

6 Claims, 6 Drawing Sheets

U.S. PATENT DOCUMENTS

| | | | |
|---|---|---|---|
| 6,179,359 B1 * | 1/2001 | Clauson et al. | 296/39.1 |
| 6,234,517 B1 * | 5/2001 | Miyahara et al. | 280/730.2 |
| 6,254,123 B1 * | 7/2001 | Urushi et al. | 280/730.2 |
| 6,296,269 B1 * | 10/2001 | Nagai et al. | 280/728.2 |
| 6,333,515 B1 * | 12/2001 | Kubota et al. | 280/730.2 |
| 6,382,660 B1 * | 5/2002 | Starner et al. | 280/728.2 |
| 6,502,855 B1 | 1/2003 | Greiner et al. | |
| 6,796,576 B2 * | 9/2004 | Aoki et al. | 280/730.2 |
| 6,848,711 B2 * | 2/2005 | Yamamura et al. | 280/730.2 |
| 6,851,710 B2 * | 2/2005 | Wong et al. | 280/743.2 |
| 6,899,350 B2 | 5/2005 | Bakhsh et al. | |
| 7,172,211 B2 | 2/2007 | Hirose | |
| 7,404,576 B2 * | 7/2008 | Lizak | 280/743.2 |
| 2005/0206140 A1 | 9/2005 | Bakhsh et al. | |
| 2005/0253366 A1 * | 11/2005 | Uno et al. | 280/730.2 |

FOREIGN PATENT DOCUMENTS

| | | |
|---|---|---|
| DE | 19639617 A1 | 4/1998 |
| DE | 29822768 U1 | 6/2000 |
| DE | 10361372 A1 | 7/2004 |
| EP | 0812739 A1 | 12/1997 |
| JP | 07096800 A * | 4/1995 |
| JP | 08175283 A * | 7/1996 |
| JP | 10-138861 | 5/1998 |
| JP | 11-263184 | 9/1999 |
| JP | 2000-159048 | 6/2000 |

OTHER PUBLICATIONS

Chinese Office Action corresponding to Chinese Patent Application No. 200610145725.5 dated Apr. 4, 2008.

* cited by examiner

STRUCTURE FOR ATTACHING INTERIOR TRIM PANEL AROUND AUTOMOTIVE FRONT PILLAR

CROSS-RELATED APPLICATIONS

This application claims priority from Japanese Patent Application No. 2005-328665; filed Nov. 14, 2005, the disclosures of which is incorporated herein by reference in its entirety.

Field of the Invention

The present invention relates to a structure for attaching an interior trim panel around an automotive front pillar. More particularly, it relates to a structure for attaching an interior trim panel around a front pillar of an automobile storing an airbag (curtain airbag, roof-side airbag) that shields a door opening on the vehicle compartment side and protects the heads of passengers at the time of expansion.

BACKGROUND OF THE INVENTION

To protect passengers from an impact load applied from the side of automobile, a passive safety device has been proposed in which an airbag is foldedly stored in an interior trim panel in the range from a front pillar to a roof side, and the airbag is deployed when the impact load is detected (refer to JP10-138861A1 and JP11-263184A1). Such a passive safety device (curtain airbag, roof-side airbag) has a construction such that the airbag is deployed to the inside of a door glass by pushing the end edge portions of a pillar garnish and a roof lining, which extend along a door opening, open at the time of deployment. Also, the pillar garnish and the roof lining are attached to a vehicle body at a position on the opposite side to the door opening with respect to the airbag. Therefore, in a portion in which a plurality of parts are joined to each other, such as a joint portion of the end portions of the roof lining and the pillar garnish, the end edge portion of the pillar garnish, which extends along the door opening, cannot be fixed sufficiently firmly, and therefore it is difficult to obtain a good appearance.

Further, in a vehicle construction in which the front pillar has a triangularly shaped window as described in JP11-263184A1, pillar garnish division portions arranged so as to surround the window are fixed within a pillar garnish body portion located on the front side in the vehicle front and rear direction, so that a fixing portion may exert an influence at the time of airbag deployment. Also, above the pillar garnish division portion, the end edge portion of the pillar garnish body portion, which extends along the door opening, is wider by the thickness of the pillar garnish division portion, which may also exert an influence on the deployment of the airbag.

SUMMARY OF THE INVENTION

The present invention has an object of providing a structure for attaching an interior trim panel around an automotive front pillar, in which in the case where an airbag, which is deployed in a curtain form between the passengers and a vehicle side wall to protect the heads of passengers, is stored in a location covered with the interior trim panel in the range from a front pillar to a roof side, an appearance in a joint portion of end portions of a plurality of interior trim panels can be improved without hindering the deploying operation of the airbag.

The present invention provides a structure for attaching an interior trim panel around an automotive front pillar, including a front pillar trim covering a vehicle compartment side of a front pillar, a roof lining being adjacent to the front pillar trim and covering a vehicle compartment side of a roof side, and an airbag stored in a space extending from an inside of the front pillar trim to an inside of the roof lining, wherein an engagement projection is provided on a vehicle body panel being located inside of the front pillar trim adjacent to the roof lining, the engagement projection being projected in a direction of the airbag deploying and located with a space from a flange of a door opening towards inside of the vehicle compartment, and an engagement portion is projected on a back surface of the front pillar trim in a direction against to said airbag deploying, so as to be engaged to said engagement projection.

By the above-described configuration, the end portion on the door opening side of the front pillar trim, in which floating is liable to occur because of the joint portion to the roof lining, can be fixed surely, and the appearance in the vehicle compartment around the joint portion can be improved. Also, since the engagement projection projects in the direction of the airbag deployment, the deployment operation of airbag is not hindered, and reliable deployment operation can be performed.

In the present invention, in a mode in which a trim holder is attached on the vehicle body panel, and the engagement projection is provided on the trim holder, the work required on the vehicle body panel is at a minimum as compared with the case where the engagement projection is formed on the vehicle body panel, and the vehicle body panel, which is a structural member, has no problem of decreased strength. Also, the degree of freedom of the shape of engagement projection and the selection of panel is high, and an engagement projection having a good balance between its engaging capability and the disengaging performance can be formed. Further, the fabrication and installation are easy. Also, in the present invention, in a mode in which the front pillar trim is provided with a rib on a back surface thereof, the rib extends in a direction substantially traversing the front pillar trim adjacent to the door opening, and the rib is provided with the engagement portion, the shape stability of the end portion of front pillar trim is enhanced, and an engagement portion having a good balance between engaging capability and disengaging performance can be formed.

In a mode in which the rib is provided with an projected edge located on the vehicle compartment side of the engagement portion projected toward the airbag nearer than the engagement portion, at the time when the airbag is deployed, by deploying the airbag while pushing the projected edge portion, the engagement portion is released from the engagement projection and the front pillar trim is opened before the airbag arrives at the engagement portion, so that the deployment property of the airbag is enhanced. Also, the airbag does not come into contact with the engagement portion, and is thus not a hindrance to deployment operation. Also, in the present invention, in a mode in which the trim holder is made of a resin, in the case where an impact load of a low level that does not operate the airbag is applied to the vehicle body, the trim holder made of this panel is advantageous because the collision energy absorbing property of front pillar trim is improved as compared with the case where the trim holder is formed by a metallic part.

In a mode in which the trim holder is provided with a fixed portion lapping on the flange of the door opening of the vehicle body panel so as to be held by an opening trim together with the flange, the trim holder can be pressed over the total length by utilizing the existing opening trim, so that the rotational movement of the trim holder is restrained, and hence the trim holder can be fixed surely. Also, the position accuracy of the engagement projection of trim holder with respect to the opening trim can be enhanced, and high appearance performance can be obtained by preventing the occurrence of a gap in the joint portion between the front pillar trim and the opening trim.

In a mode in which the trim holder is provided with a support portion projecting and being in contact with a back surface of the roof lining so that the end portion of the roof lining is held between the support portion and a trim sealing lip of the opening trim, a portion around the trim division line in which a plurality of interior trim members lap on each other, especially the end portion of the roof lining, is supported by the support portion, and the end portion of the roof lining is pressed from the back surface side against the reaction force of the lip of the opening trim. Thereby, the end portion of the roof lining is prevented from being deformed, and thus the appearance around the trim division line can be improved.

As another mode, the present invention provides a structure for attaching an interior trim panel around an automotive front pillar, including a front pillar trim covering a vehicle compartment side of a front pillar, a roof lining being adjacent to the front pillar trim and covering a vehicle compartment side of a roof side, and an airbag stored in a space extending from an inside of the front pillar trim to an inside of the roof lining, wherein the front pillar is provided with a triangularly shaped window, the front pillar trim is divided by a division line leading from an upper end of the triangularly shaped window to a side edge of a windshield glass opening so as to form a front pillar front trim located on a front side of the window and a front pillar rear trim located on a rear side of the window, and the airbag is stored in a space extending from an inside of the front pillar rear trim to the inside of the roof lining.

According to the above-described configuration, the division line of the front pillar front trim and the front pillar rear trim is arranged at a position out of the range of airbag storage, so that the joint portion of the division line and a fixing portion arranged near the joint portion do not exert an influence on the deployment of the airbag. Also, since the configuration has only to be made such that only the front pillar rear trim that stores the airbag is openable, the opening range can be made narrow, and the operation is easy. Also, a special structure and a special panel used for storing the airbag only need to be used for the front pillar rear trim, so that the structure can be formed at a low cost as compared with the case of an integral structure.

In the present invention, in a mode in which he front pillar rear trim is provided with an extension portion extended from an edge along the division line to a back surface of the front pillar front trim, and is fixed to a vehicle body panel of the front pillar in the extension portion, the front pillar rear trim is surely fixed on the rear side in the direction of airbag deployment, so that the front pillar rear trim is prevented from being dropped by a shock at the time of airbag deployment. Also, the position is the optimum position separate from the end edge portion on the door opening side of the front pillar rear trim, which is an airbag deployment opening, so that the fixing portion does not exert an adverse influence on the deployment performance of the airbag. Further, the fixing portion of the front pillar rear trim need not be hidden separately by a separate part such as a cap, which can reduce the assembling manpower and facilitate the assembling work.

Also, in a mode in which the front pillar rear trim is joined to the front pillar front trim in the extension portion, the front pillar front trim is surely fixed in the joint portion to the front pillar rear trim, so that the appearance in the vehicle compartment around the joint portion is good.

DETAILED DESCRIPTION OF THE EMBODIMENTS OF THE INVENTION

The present invention now will be described more fully hereinafter in which embodiments of the invention are provided with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs.

Figure 1:
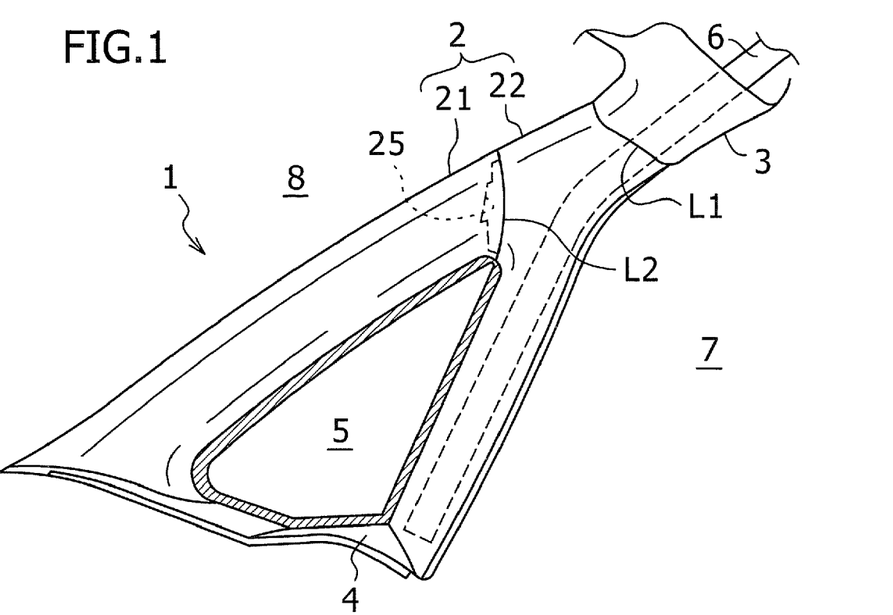
FIG. 1 is a perspective view of a portion near a front pillar of a vehicle using a structure for attaching an interior trim panel in accordance with an embodiment of the present invention, being viewed from the vehicle compartment side.

FIG. 1 is a perspective view showing a front pillar 1 and the surroundings, being viewed from the vehicle compartment side. The vehicle compartment side of the front pillar 1 is covered with a front pillar trim 2, which is an interior trim panel such as a resin. The upper end of the front pillar trim 2 is connected to a roof lining 3, which is an interior trim panel covering a roof side portion along a door opening 7 on the ceiling compartment side, on a division line L1, and the lower end of the front pillar trim 2 is connected to a garnish 4 arranged in an instrument panel side portion, not shown. Along the door opening 7 in the range from the front pillar 1 to the roof side portion, an airbag 6 is stored in a space between a steel sheet (10) constituting a vehicle body and the front pillar trim 2 and the roof lining 3 covering the vehicle compartment side so that the airbag 6 is deployed into the vehicle compartment by pushing the end edges of the interior trim panels (2, 3) open at the time of deployment.

The front pillar 1 has a triangularly shaped window 5. The front pillar trim 2 covering the vehicle compartment side is divided on a division line L2 leading from the upper end of the triangularly shaped window 5 to a windshield glass opening portion 8, and is formed by a front pillar front trim 21 located in front of the window 5 in the vehicle front and rear direction and a front pillar rear trim 22 located in the rear of the window 5.

Figure 2:
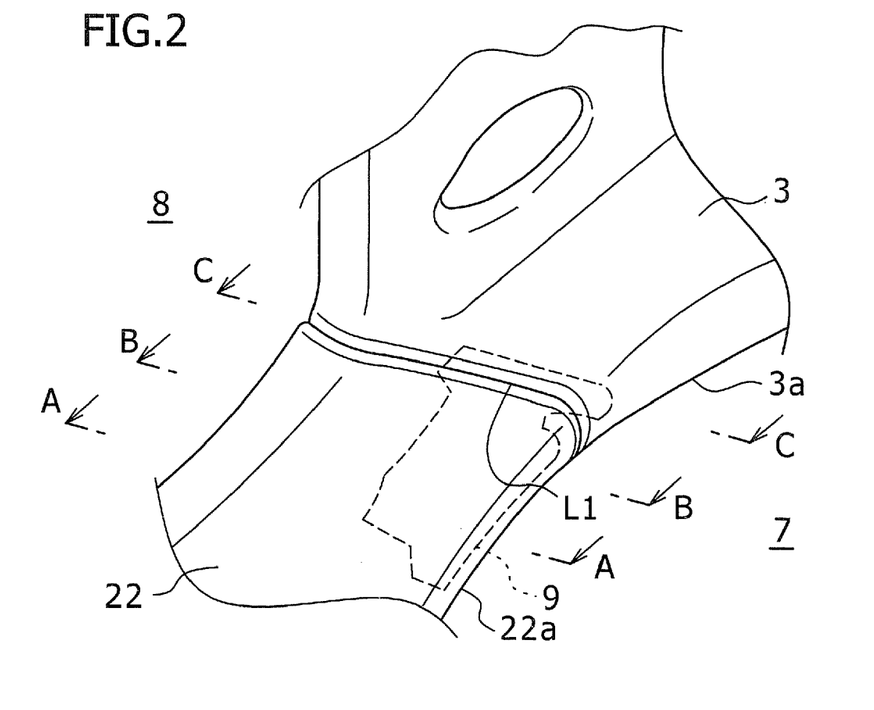
FIG. 2 is an enlarged perspective view showing a portion near a trim division line L1 shown in FIG. 1.

FIG. 2 is an enlarged view showing a portion near the division line L1 shown in FIG. 1 between the front pillar rear trim 22 of the front pillar 1 and the roof lining 3. As shown in FIG. 2, the front pillar rear trim 22 is connected to the roof lining 3 so that the end edge of the front pillar rear trim 22 is lapped on the end portion of the roof lining 3, and the end edge of the front pillar rear trim 22 forms the division line L1. The lower end of the division line L1 reaches the door opening 7, and on a flange 11 of a vehicle body panel 10 along the door opening 7, an opening trim 12 is fitted to cover the end portion of the flange 11 and to improve the appearance as shown in FIGS. 4 to 8.

The end edge on the door opening 7 side of the front pillar rear trim 22 is brought into contact with a trim sealing lip 12a (flexible rubber piece) of the opening trim 12. In the portion of the division line L1 in which the front pillar rear trim 22 and the roof lining 3 are lapped on each other, a gap is easily produced by variations at the assembly time or poor part accuracy. Thereupon, in the present invention, a trim holder 9 is installed on the inside of the division line L1 between the front pillar rear trim 22 and the roof lining 3.

Figure 3:
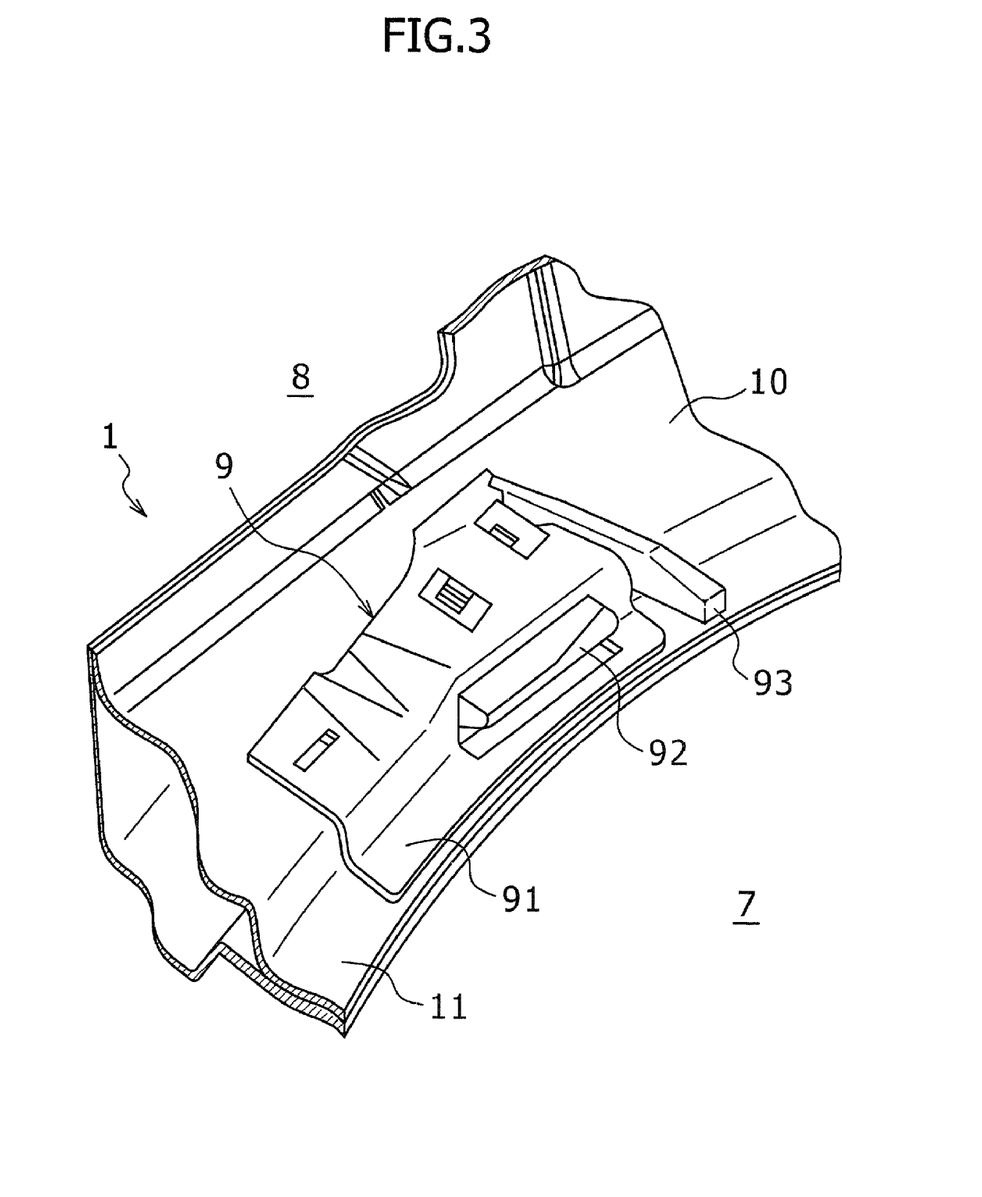
FIG. 3 is a perspective view showing a state in which an interior trim panel is removed at the position of FIG. 2.
Figure 4:
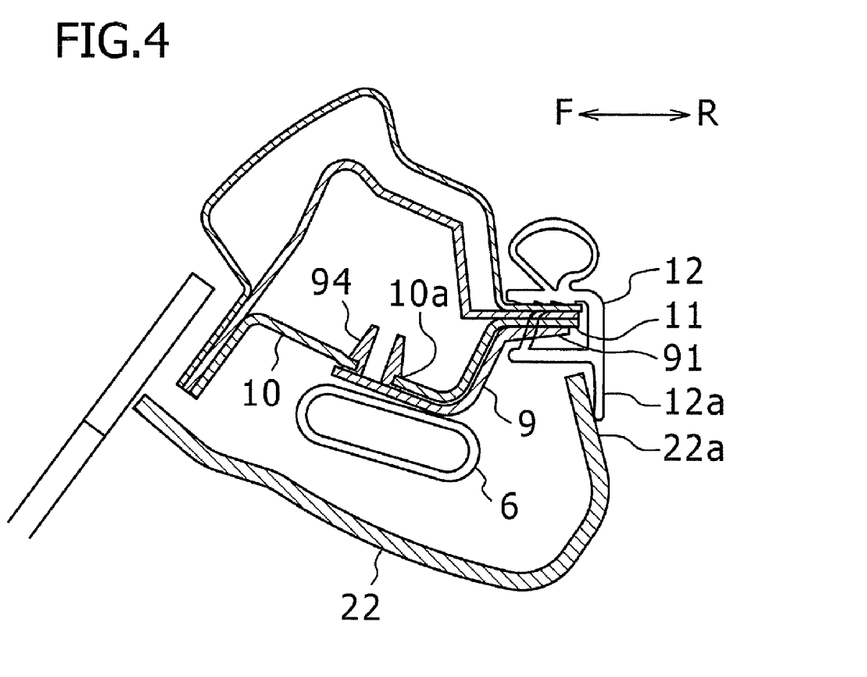
FIG. 4 is a sectional view taken along the line A-A of FIG. 2.
Figure 5:
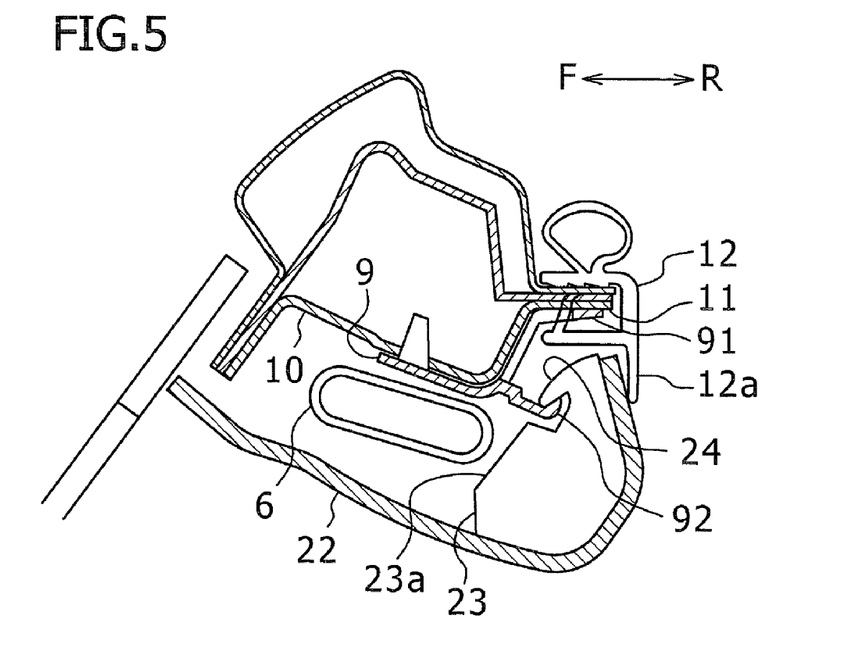
FIG. 5 is a sectional view taken along the line B-B of FIG. 2.

FIG. 3 shows a state in which the front pillar rear trim 22 and the roof lining 3 are removed at the position of FIG. 2, and the vehicle body 10 of the front pillar 1 and a roof side formed by a steel sheet is exposed. In FIG. 3, the trim holder 9 has a basic shape of substantially L-shaped cross section so as to match the corner portion of the vehicle body 10, and a fixed portion 91 extending along the flange 11 of the vehicle body 10 is provided in one side edge portion of the trim holder 9. Further, as shown in FIG. 5, an engagement projection 92 is provided so as to project from a side surface separated to the vehicle compartment side with respect to the flange 11 toward the door opening 7 so as to be substantially parallel with the flange 11. The engagement projection 92 has a claw-shaped cross section that is open toward the outside of the vehicle compartment, and has a fixed width in the lengthwise direction of the front pillar 1. Also, a support projection 93 (support portion), described later, is provided in the end portion on the roof lining 3 side of the trim holder 9.

The trim holder 9 is fixed to the vehicle body 10 by inserting a clip 94 formed integrally with the trim holder 9 into a hole 10a formed in advance in the vehicle body 10 to lock the trim holder 9 and by holding the fixed portion 91 on the opening trim 12 together with the flange 11. By this configuration, the trim holder 9 is surely fixed to the vehicle body 10 in a state in which the turning thereof is restrained. The trim holder 9 may be mounted to the vehicle body 10 by using a separate clip or screw in place of the clip 94.

The front pillar rear trim 22 has a construction such as to be fixed in an extension portion 25 (described later in detail) located on the opposite side to the door opening 7 with respect to the airbag 6, and on the other hand, is engaged to the engagement projection 92 of the trim holder 9 on the door opening 7 side, which is the deployment side of the airbag 6, so as to be openable at the time of deployment of the airbag 6. Specifically, on the back surface of an end edge portion 22a on the door opening 7 side of the front pillar rear trim 22, a rib 23 extending in the direction traversing the front pillar rear trim 22 is provided. An engagement portion 24 is formed by cutting the edge portion of the rib 23, and thus the engagement portion 24 is engaged to the engagement projection 92. In this state, the tip end of the engagement portion 24 is located between the lip 12a of the opening trim 12 and the engagement projection 92.

By the above-described configuration of the engagement portion 24 and the trim holder 9 having the engagement projection 92, in the portion near the trim division line L1 where floating is liable to occur, the end edge portion 22a on the door opening 7 side of the front pillar rear trim 22 is fixed surely, by which the appearance is improved, and also the front pillar rear trim 22 can be opened with a predetermined pressure at the time of deployment of the airbag 6.

Next, the operation of the engaging mechanism of the aforementioned engagement projection 92 and engagement portion 24 at the time of airbag deployment is explained in detail.

Figure 6:
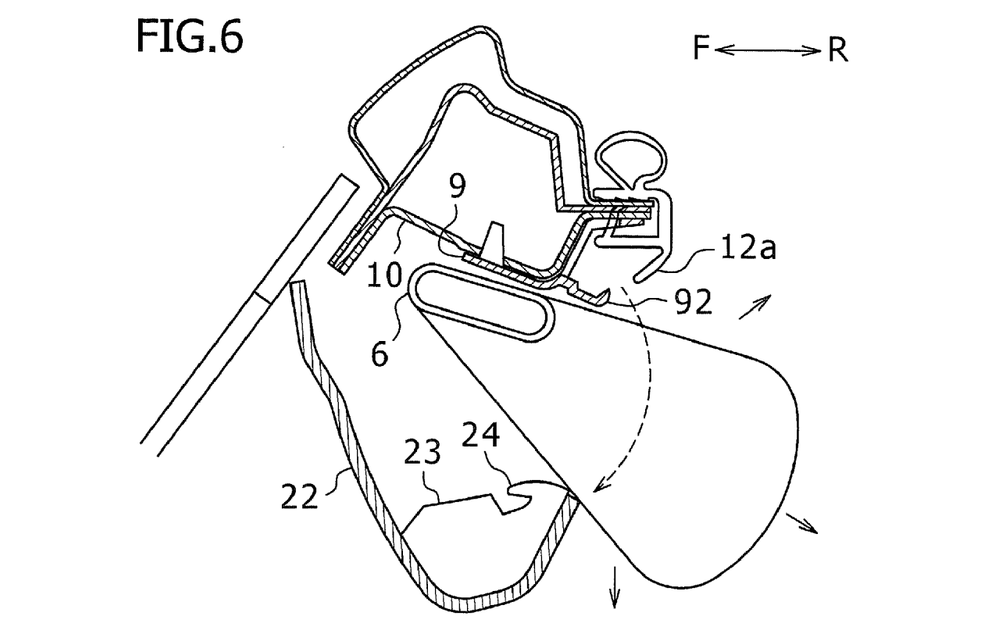
FIG. 6 is a sectional view taken along the line B-B of FIG. 2 in a state in which an airbag is deployed.

As shown in FIGS. 5 and 6, at the time of deployment of the airbag 6, the rib 23 provided on the front pillar rear trim 22 is first pushed by the expansion pressure of airbag, and thereby the engagement portion 24 provided on the rib 23 is moved in the deployment direction of the air bag 6. By the removal of the engagement portion 24 from the engagement projection 92, the front pillar rear trim 22 is pushed open at once, so that the airbag 6 deploys to the vehicle compartment side. At this time, the lip 12a, which is located on the opposite side with the engagement portion 24 and the edge portion 22a of the front pillar rear trim 22 being held therebetween, can be elastically deformed easily by the flexibility of itself, and can be deflected in the direction such that the engagement portion 24 is disengaged, so that the lib 12a does not hinder the deployment of the airbag 6.

Also, since an edge portion 23a of the rib 23, which is located on the vehicle compartment side with respect to the engagement portion 24, is projected to the airbag 6 side from the engagement portion 24, at the expansion time of the airbag 6, the rib 23 is pushed and the engagement portion 24 is disengaged before the airbag 6 arrives at the engagement portion 24. Therefore, the airbag 6 is prevented from coming into contact with the engagement portion 24 or being hooked, by which the airbag 6 can be deployed reliably. The engagement portion 24 of the front pillar rear trim 22 and the trim holder 9 are preferably formed of a resin material. The use of this material is advantageous in terms of collision energy absorption before the airbag 6 is operated as compared with a construction of being fixed by a metallic part such as a bolt.

Next, the support structure around the division line L1 of the roof lining 3 is explained.

Figure 7:
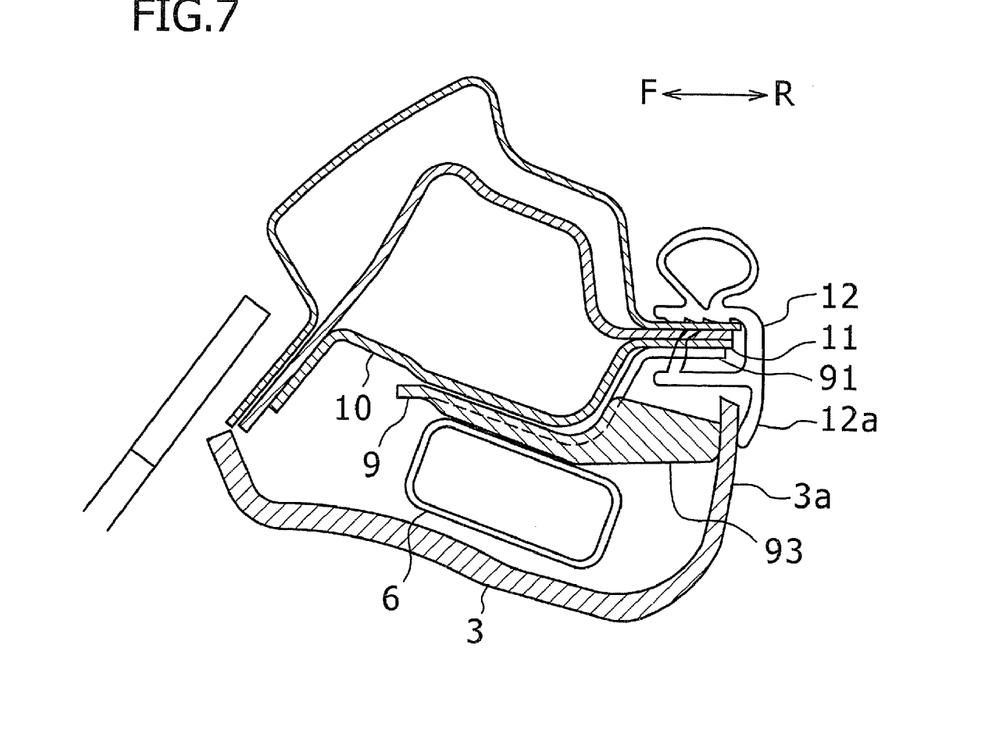
FIG. 7 is a sectional view taken along the line C-C of FIG. 2.

As shown in FIG. 3, the trim holder 9 is provided with the support projection 93 in the end portion on the roof lining 3 side. The tip end of the support projection 93 abuts on the back surface of an end edge portion 3a of the roof lining 3 to support the end edge portion 3a as shown in FIG. 7. Thereby, the end edge portion 3a of the roof lining 3 is held between the support projection 93 and the lip 12a of the opening trim 12. In particular, since the end edge of the front pillar rear trim 22 laps on the end portion of the roof lining 3 extending along the division line L1, the roof lining 3 is supported from the back surface side by the support projection 93, by which the roof lining 3 is firmly integrated with the front pillar rear trim 22 engaged by the engagement projection 92 of the same trim holder 9, which can improve the appearance of this portion.

Also, the edge portion of the support projection 93 is projected to the vehicle compartment side from the body of the trim holder 9 and is brought into contact with the airbag 6, by which the position of the airbag 6 can be regulated on the back surface side of the roof lining 3. Thereby, in the end portion of the roof lining 3 in which a sense of denting is easily produced when being pushed, the sense of denting is alleviated by the airbag 6 brought close to the back surface of the roof lining 3. Therefore, the feel at the time of being pushed is improved, and the appearance improving effect can be obtained by preventing the occurrence of a gap.

Figure 8:
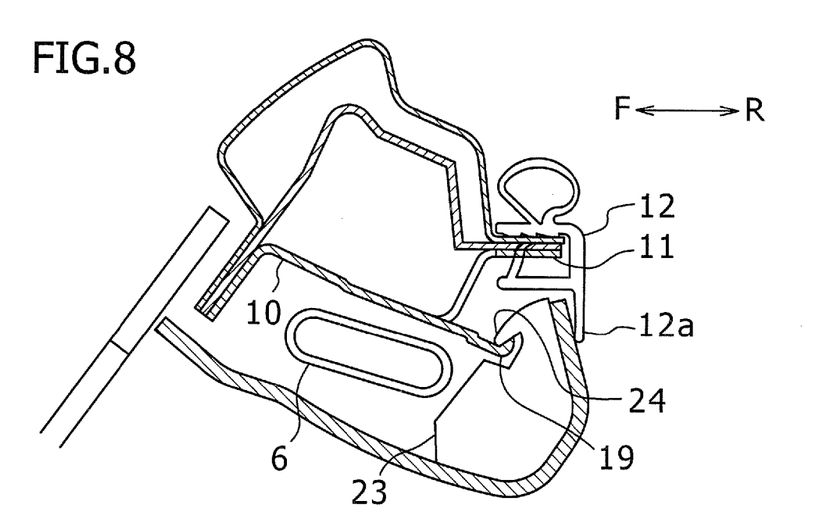
FIG. 8 is a sectional view corresponding to the A-A section of FIG. 2 in another embodiment of the present invention.

As described above, the trim holder 9 is installed on the vehicle body 10 side on the trim division line L1, and the trim holder 9 is provided with the position regulating mechanism using the engaging structure (the engagement projection 92 and the engagement portion 24) with respect to the end edge portion 22a on the door opening 7 side of the front pillar rear trim 22, the position regulating mechanism (fixed portion 91) with respect to the opening trim 12, and the position regulating mechanism (support projection 93) of the end portion 3a on the door opening 7 side of the roof lining 3. Thereby, the appearance and quality on the trim division line L1, which is a joint portion of a plurality of interior trim parts, are improved. It is to be noted that there may be used a structure in which a cut and raised portion 19 is provided on an inner panel of the vehicle body 10 in place of the trim holder 9 as shown in FIG. 8, or a structure in which a bracket separate from the vehicle body 10 is provided and the engagement portion 24 of the front pillar rear trim 22 is fitted to the bracket.

Next, a structure of the trim division line L2, which is a joint portion of the front pillar trim 21 and the front pillar rear trim 22 shown in FIG. 1, and the surroundings thereof is described.

Figure 9:
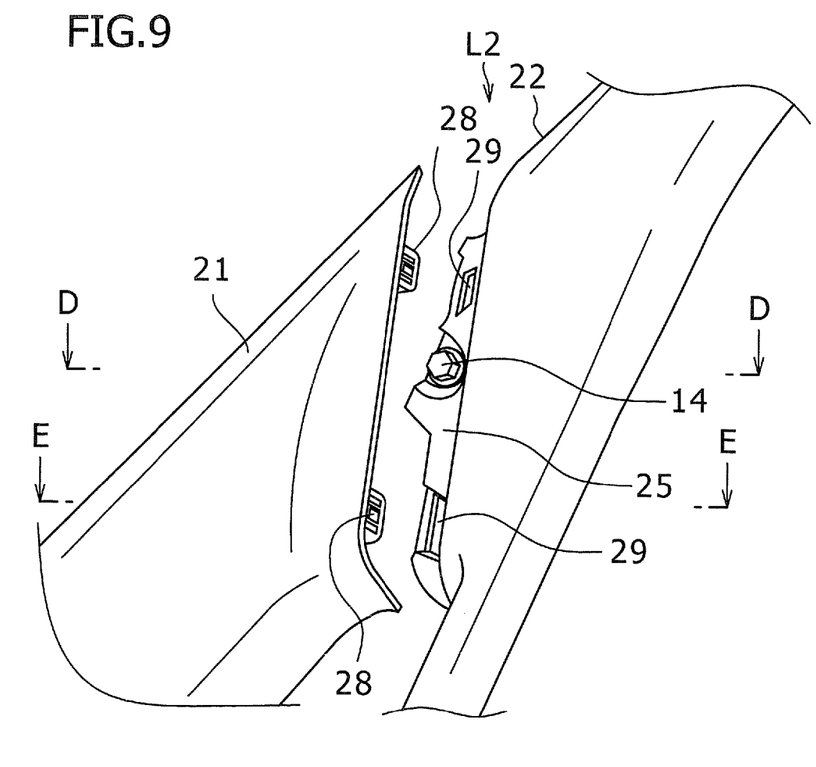
FIG. 9 is an exploded and enlarged perspective view showing a portion near a trim division line L2 shown in FIG. 1.
Figure 10:
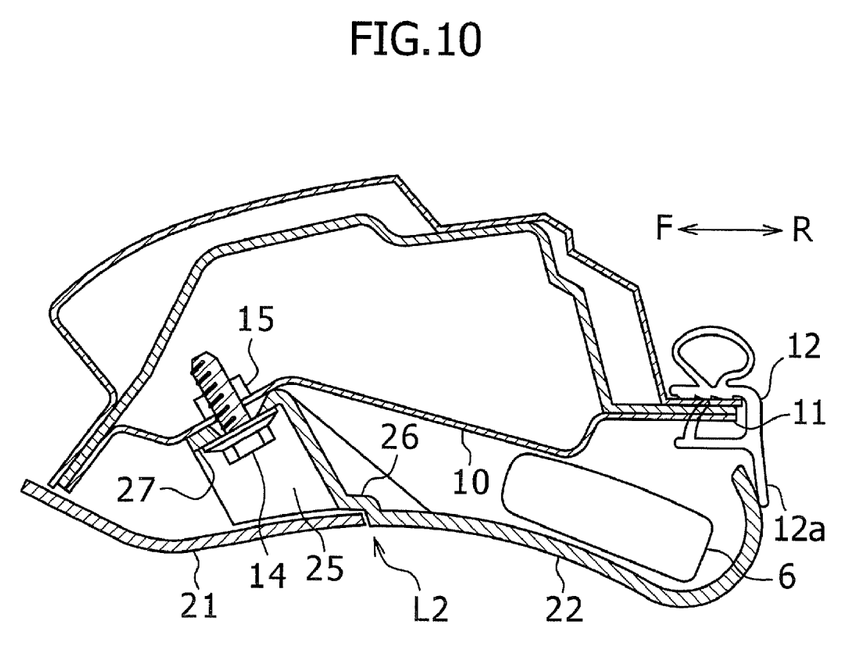
FIG. 10 is a sectional view taken along the line D-D of FIG. 9.

The front pillar rear trim 22 must be mounted firmly to the vehicle body 10 on the rear side in the direction of airbag deployment so as to be prevented from being dropped by a shock at the time when the airbag 6 is deployed as described above. For this reason, as shown in FIGS. 9 and 10, the extension portion 25 extending from the trim division line L2 of the front pillar rear trim 22 to the vehicle body 10 is provided, and the extension portion 25 is formed with a seat surface 27 for fastening the extension portion 25 to the vehicle body 10 with a bolt. A bolt 14 is inserted into a hole provided in the seat surface 27 and is engaged threadedly with a nut 15 fixed on the vehicle body 10 side, by which the front pillar rear trim 22 is mounted to the vehicle body 10.

The extension portion 25 is located one step lower than the design surfaces of the front pillar rear trim 22 and the front pillar front trim 21 by a step portion 26. Therefore, as shown in FIG. 10, the extension portion 25 can be covered with the front pillar front trim 21, so that the fastening portion of the bolt 14 need not be hidden separately by a cap etc., which can reduce the assembling manpower. Also, the joint portion on the trim division line L2 is made flat by the step portion 26, and therefore no influence is exerted on the appearance of the surrounding portion of the windshield glass opening portion 8 within the field of view of the driver.

Figure 11:
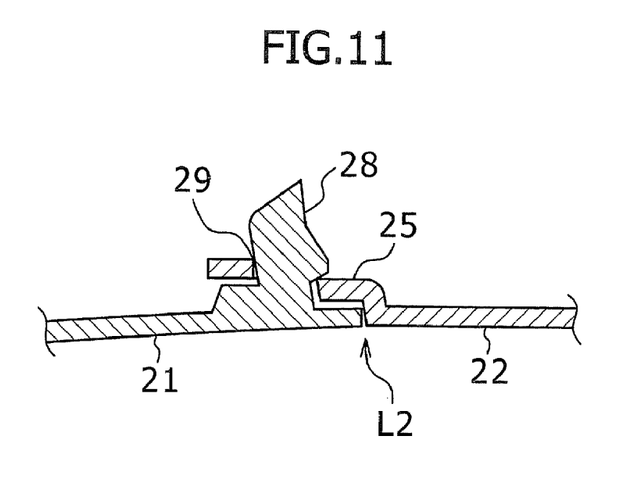
FIG. 11 is a sectional view taken along the line E-E of FIG. 9.

Also, as shown in FIGS. 9 and 11, clip portions 28 are integrally formed on the back surface of the end edge portion of the front pillar front trim 21. The clip portions 28 are inserted in and locked to attaching holes 29 provided on the extension portion 25, by which the front pillar front trim 21 can be fixed to the extension portion 25. Therefore, the edge portion of the front pillar front trim 21 is prevented from floating on the trim division line L2, and thereby the appearance can further be improved.

By the fixing structure in the extension portion 25, as shown in FIG. 10, the seat surface 27, which serves as a fastening portion for the bolt 14, is located on the rear side in the deployment direction of the airbag 6, and is also located at a place separate from the end edge portion 22a of the front pillar rear trim 22, which serves as the deployment opening of the airbag 6, so that the bolt fastening portion does not exert an adverse influence on the deployment performance of the airbag 6. Also, in order to prevent the airbag from being damaged by a shock at the time of airbag deployment, an expensive special material with high impact resistance must be used for the front pillar trim 2. However, the front pillar trim 2 is divided into the front pillar front trim 21 on the front side in the vehicle front and rear direction of the triangularly shaped window 5 and the front pillar rear trim 22 on the rear side, and the expensive special material is used limitedly for only the front pillar rear trim 22 storing the airbag and the airbag is stored in the range from the front pillar rear trim 22 to the roof lining 3, by which the structure can be made low in cost as compared with an integral structure.

In the above-described embodiment, the case where the front pillar 1 is provided with the triangularly shaped window 5 has been explained. The present invention is not limited to the above-described embodiment, and the structure for attaching an interior trim panel around the trim division line L1 can be applied to a vehicle having no triangularly shaped window.

The above is a description of one embodiment of the present invention. The present invention is not limited to the above-described embodiment, and various modifications and changes can be made based on the technical concept of the present invention.

What is claimed is:

1. A structure for attaching an interior trim panel around an automotive front pillar, comprising:
   a front pillar trim covering a vehicle compartment side of a front pillar, wherein the front pillar trim is provided with a rib on a back surface thereof;
   a roof lining being adjacent to the front pillar trim and covering a vehicle compartment side of a roof side; and
   an airbag stored in a space extending from an inside of the front pillar trim to an inside of the roof lining, wherein
   an engagement projection is provided on a vehicle body panel being located inside of the front pillar trim adjacent to the roof lining, the engagement projection being projected in a direction of the airbag deploying and located with a space from a flange of a door opening towards inside of the vehicle compartment, and an engagement portion is projected on a back surface of the front pillar trim in a direction against to said airbag deploying, so as to be engaged to said engagement projection;
   the rib extends in a direction substantially traversing the front pillar trim adjacent to the door opening, and the rib is provided with the engagement portion; and
   the rib is provided with a projected edge located on the vehicle compartment side of the engagement portion projected toward the airbag nearer than the engagement portion, wherein the projected edge is configured to first receive the airbag deploying.

2. The structure for attaching an interior trim panel around an automotive front pillar according to claim 1, wherein a trim holder is attached on the vehicle body panel, and the engagement projection is provided on the trim holder.

3. The structure for attaching an interior trim panel around an automotive front pillar according to claim 2, wherein the trim holder is made of a resin.

4. The structure for attaching an interior trim panel around an automotive front pillar according to claim 2, wherein the trim holder is provided with a fixed portion lapping on the flange of the door opening of the vehicle body panel so as to be held by an opening trim together with the flange.

5. The structure for attaching an interior trim panel around an automotive front pillar according to claim 2, wherein the trim holder is provided with a support portion projecting and being in contact with a back surface of the roof lining so that an end portion of the roof lining is held between the support portion and a trim sealing lip of an opening trim.

6. The structure for attaching an interior trim panel around an automotive front pillar according to claim 1, wherein the engagement projection has a claw-shaped cross section that is open toward the outside of the vehicle compartment and is configured to engage with a tip of the engagement portion.

* * * * *